United States Patent
Hashish

(10) Patent No.: US 8,147,293 B2
(45) Date of Patent: Apr. 3, 2012

(54) FLUID SYSTEM AND METHOD FOR THIN KERF CUTTING AND IN-SITU RECYCLING

(75) Inventor: Mohamed Hashish, Bellevue, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 12/287,374

(22) Filed: Oct. 7, 2008

(65) Prior Publication Data

US 2009/0042492 A1 Feb. 12, 2009

Related U.S. Application Data

(62) Division of application No. 11/716,383, filed on Mar. 9, 2007, now Pat. No. 7,934,977.

(51) Int. Cl.
*B24C 1/00* (2006.01)

(52) U.S. Cl. ............................................. 451/38; 451/87

(58) Field of Classification Search .................. 451/87, 451/38–40
See application file for complete search history.

(56) References Cited

U.S. PATENT DOCUMENTS

| | | | |
|---|---|---|---|
| 2,577,465 A | 12/1951 | Jones et al. | |
| 2,985,050 A | 5/1961 | Schwacha | |
| 3,624,966 A | 12/1971 | Palmer | |
| 4,165,587 A | 8/1979 | Cottingham et al. | |
| 4,232,487 A * | 11/1980 | Brown | 451/88 |
| 4,478,368 A | 10/1984 | Yie | |
| 4,555,872 A | 12/1985 | Yie | |
| 4,563,840 A | 1/1986 | Urakami | |
| 4,648,215 A | 3/1987 | Hashish et al. | |
| 4,711,056 A | 12/1987 | Herrington et al. | |
| 4,936,512 A | 6/1990 | Tremoulet, Jr. | 239/596 |
| 4,951,429 A | 8/1990 | Hashish et al. | 51/439 |
| 4,955,164 A | 9/1990 | Hashish et al. | |
| 5,018,317 A | 5/1991 | Kiyoshige et al. | |

(Continued)

FOREIGN PATENT DOCUMENTS

DE 10225304 A1 12/2003

(Continued)

OTHER PUBLICATIONS

H2O Jet Products, online product brochure found at: http://web.archive.org/web/20021209032309/www.h2ojetcorp.cpom/products/newproducts/..., downloaded date Sep. 22, 2006.

*Primary Examiner* — Maurina Rachuba
(74) *Attorney, Agent, or Firm* — Seed IP Law Group PLLC

(57) ABSTRACT

A fluid jet system for achieving a kerf width less than 0.015 inches is provided. In one embodiment, the system includes an orifice mount having a high-pressure fluid bore and an abrasive bore configured to communicate an abrasive mixture in form of a paste or foam to at least a portion of the high-pressure fluid bore. The system further includes a pressure-generating bore and a thin kerf mixing tube respectively provided toward opposing longitudinal ends of the mount body, minimizing a distance therebetween. A method of in-situ recycling of abrasives in the high-pressure fluid jet system includes catching the exiting abrasive-fluid mixture in a catching device, filtering the mixture in a filtering device, and directly pumping the filtered abrasive-fluid mixture to the mixing area without requiring conditioning of the mixture to remove liquids.

29 Claims, 8 Drawing Sheets

U.S. PATENT DOCUMENTS

| | | | |
|---|---|---|---|
| 5,092,085 A | 3/1992 | Hashish et al. | 51/439 |
| 5,144,766 A | 9/1992 | Hashish et al. | 51/439 |
| 5,155,946 A | 10/1992 | Domann | |
| 5,320,289 A | 6/1994 | Hashish et al. | 239/434 |
| 5,335,459 A | 8/1994 | Dale | |
| 5,469,768 A | 11/1995 | Schumacher | |
| 5,512,318 A | 4/1996 | Raghavan et al. | |
| 5,551,909 A | 9/1996 | Bailey | |
| 5,626,508 A | 5/1997 | Rankin et al. | |
| 5,643,058 A | 7/1997 | Erichsen et al. | |
| 5,782,673 A * | 7/1998 | Warehime | 451/2 |
| 5,827,114 A * | 10/1998 | Yam et al. | 451/75 |
| 5,851,139 A | 12/1998 | Xu | 451/102 |
| 5,908,349 A * | 6/1999 | Warehime | 451/102 |
| 6,000,308 A | 12/1999 | LaFountain et al. | |
| 6,077,152 A | 6/2000 | Warehime | |
| 6,155,245 A * | 12/2000 | Zanzuri | 125/12 |
| 6,280,302 B1 | 8/2001 | Hashish et al. | |
| 6,328,638 B1 | 12/2001 | Hopkins et al. | 451/88 |
| 6,361,416 B1 | 3/2002 | Hopkins et al. | 451/88 |
| 6,383,062 B1 | 5/2002 | Jou | |
| 6,464,567 B2 | 10/2002 | Hashish et al. | |
| 6,715,701 B1 | 4/2004 | Julien | |
| 6,752,686 B1 | 6/2004 | Hashish et al. | |
| 6,755,725 B2 | 6/2004 | Hashish et al. | |
| 6,805,618 B1 * | 10/2004 | Ward et al. | 451/87 |
| 6,851,627 B2 | 2/2005 | Hashish et al. | |
| 6,875,084 B2 | 4/2005 | Hashish et al. | |
| 6,924,454 B2 | 8/2005 | Massa et al. | |
| 6,932,285 B1 | 8/2005 | Zeng | |
| 6,939,205 B2 | 9/2005 | Hopf et al. | |
| 6,945,859 B2 | 9/2005 | Hashish et al. | |
| 7,341,504 B1 | 3/2008 | Chen | |
| 2003/0037650 A1 | 2/2003 | Knaupp et al. | |
| 2003/0047495 A1 * | 3/2003 | Olejnik | 209/734 |
| 2004/0107810 A1 | 6/2004 | Sciulli et al. | |
| 2004/0137825 A1 | 7/2004 | Hertz | |
| 2004/0235395 A1 | 11/2004 | Hashish et al. | |
| 2005/0017091 A1 | 1/2005 | Olsen et al. | |
| 2007/0093178 A1 * | 4/2007 | Gadd | 451/8 |
| 2007/0093179 A1 * | 4/2007 | Gadd | 451/8 |
| 2007/0093180 A1 * | 4/2007 | Gadd | 451/8 |
| 2007/0165060 A1 | 7/2007 | Helmig et al. | |

FOREIGN PATENT DOCUMENTS

| | | |
|---|---|---|
| DE | 202005018108 U1 | 2/2006 |
| EP | 0119338 A1 | 9/1984 |
| EP | 0248638 A2 | 12/1987 |
| EP | 0375887 B1 | 7/1990 |
| EP | 0382319 A2 | 8/1990 |
| EP | 0391500 A2 | 10/1990 |
| EP | 1422026 B1 | 5/2004 |
| WO | 9219384 A1 | 11/1992 |
| WO | 0044292 A1 | 8/2000 |
| WO | 0056466 A2 | 9/2000 |
| WO | 01/43917 A2 | 6/2001 |
| WO | 03011524 A1 | 2/2003 |
| WO | 2004/025724 A1 | 3/2004 |

* cited by examiner

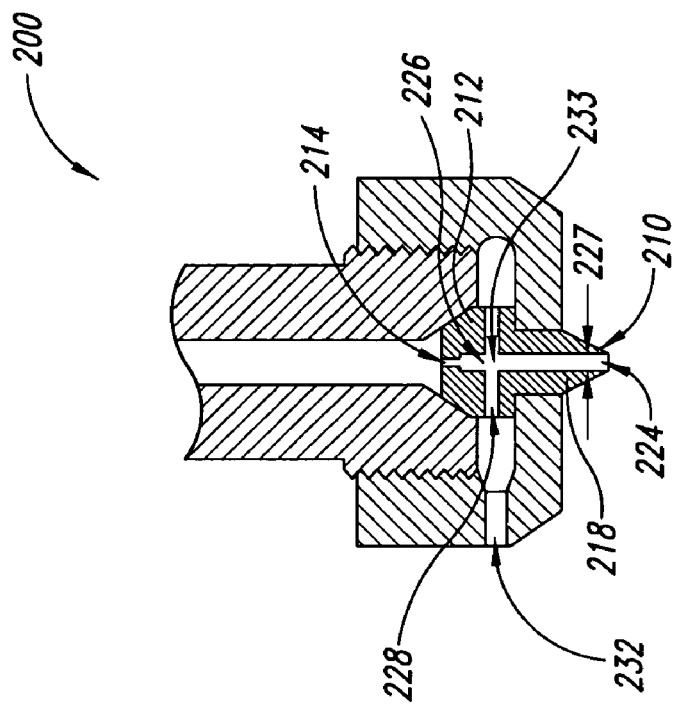
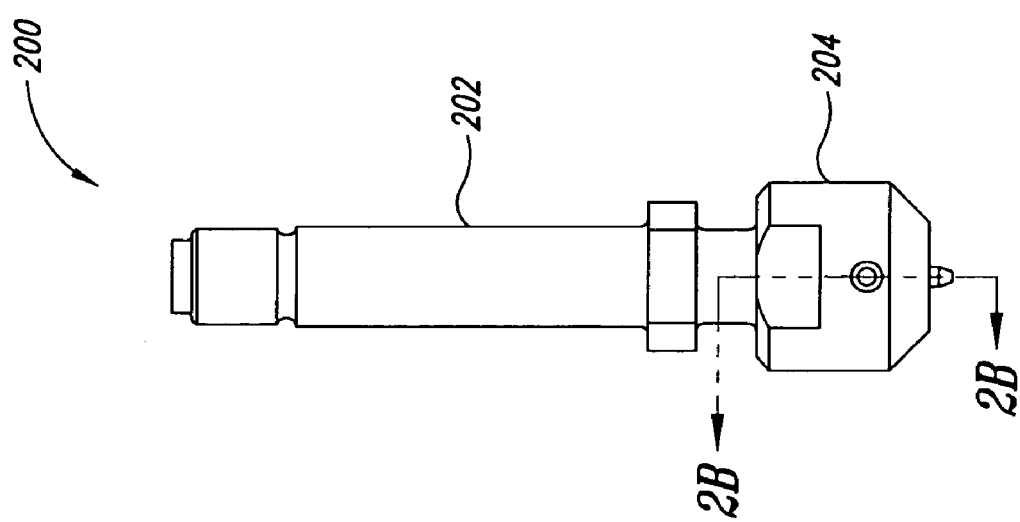
FIG. 2B
FIG. 2A

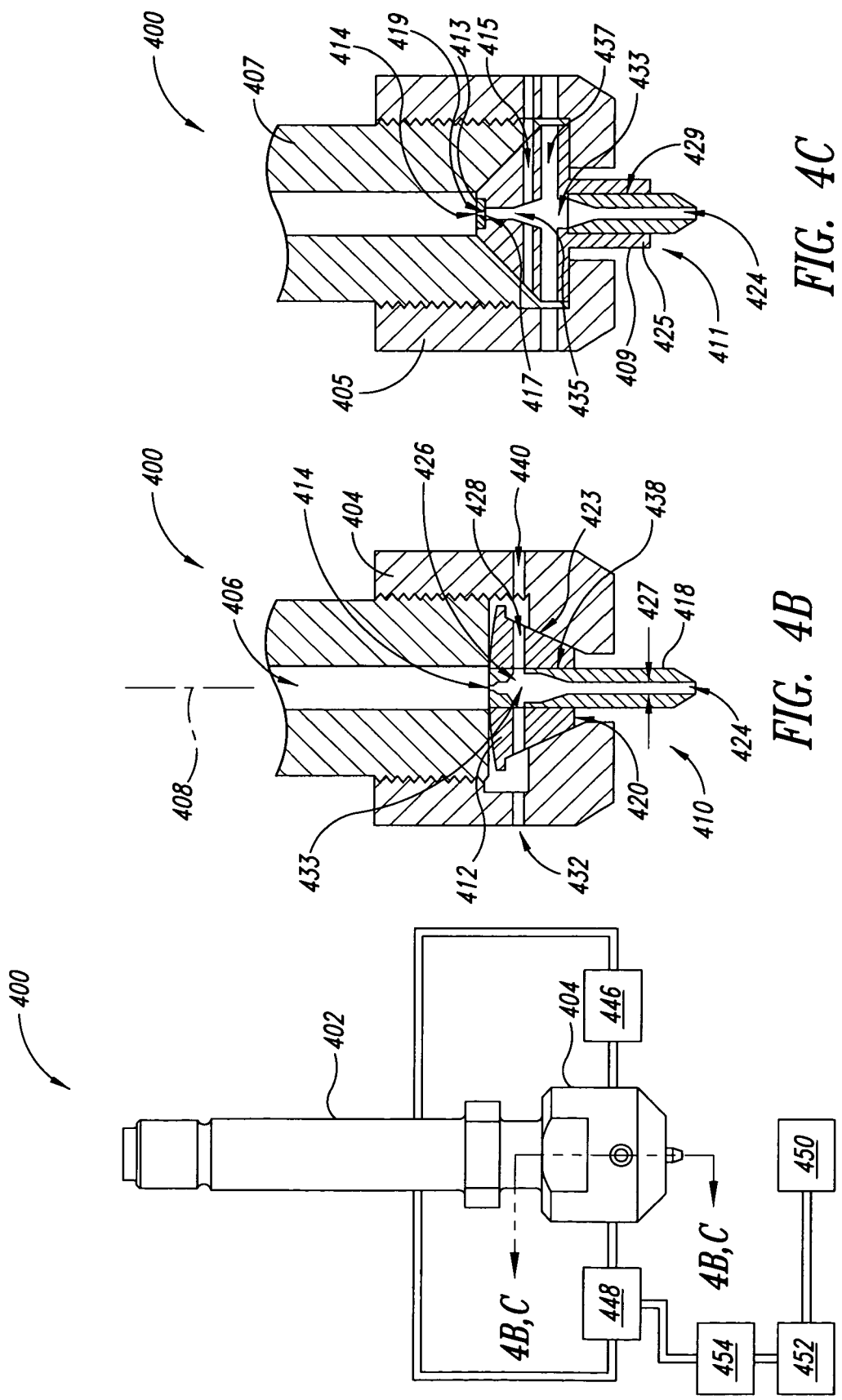

FLUID SYSTEM AND METHOD FOR THIN KERF CUTTING AND IN-SITU RECYCLING

CROSS-REFERENCE TO RELATED APPLICATION

This application is a divisional of U.S. patent application Ser. No. 11/716,383, filed Mar. 9, 2007, now pending, which application is incorporated herein by reference in its entirety.

BACKGROUND OF THE INVENTION

1. Field of the Invention

The present invention is generally related to methods and systems for generating fluid jets, and more particularly, to a high-pressure fluid system and method for generating thin fluid jets.

2. Description of the Related Art

Fluid jets have been used to clean, cut, or otherwise treat substrates by pressurizing and focusing jets of water or other fluids up to and beyond 100,000 psi and directing the jets against the substrates. The fluid jets can have a variety of cross-sectional shapes and sizes, depending on the particular application. For example, the jets can have a relatively small, round cross-sectional shape for cutting the substrates. The jets can instead have a larger, and/or non-round cross-sectional shape for cleaning or otherwise treating the surfaces of the substrates.

Some systems that generate the high-pressure fluid jet, mix water and abrasives in a mixing chamber before the jet exits the system from a downstream fluid jet exit tube. Typically, in cutting and machining applications, it is desirable to minimize a kerf width at which the fluid jet can cut or machine a material. Kerf width generally refers to the width at which the fluid jet can cut or machine a part or material.

One drawback of conventional fluid jet systems, especially abrasive fluid jet systems (i.e., systems that form the jet from a mixture of abrasives and water) is that they typically cannot cut or machine at a kerf width of less than 0.015 inches. Fluid jet exit tube materials with bores having a diameter less than 0.015 inches are generally not commercially available, and even if available, using such fluid jet exit tubes typically requires extremely accurate fluid jet alignment. Achieving the required accuracy level is not likely possible with conventional fluid jet nozzle designs because the mixing chamber of most existing nozzles is not designed or optimized for use with fluid jet exit tubes with a diameter of less than 0.015 inches.

One reason is that generally a distance from the fluid jet-forming orifice to the fluid jet exit tube entry in existing systems is relatively large, which allows jet spreading (i.e., a widening of the fluid jet between the orifice and the fluid jet exit tube before entry into the fluid jet exit tube). Furthermore, small-bore diameter fluid jet exit tubes require feeding finer and/or dry abrasives; however, finer abrasives are difficult to feed consistently and tend to clog at least a portion of the system.

Another disadvantage of systems that use dry abrasives is that they require conditioning of the exiting liquid-abrasive mixture to substantially completely dry the mixture in order to recycle it back into the system. The conditioning process is time-consuming and therefore, typically, recycling systems are not adapted to recycle the abrasives in-situ.

To prevent clogging, some conventional fluid jet systems feed abrasive slurries into the system; however, these systems generally suffer from poor nozzle suction and inefficient slurry acceleration. The inefficiency of the slurry acceleration in conventional systems is due to the fluid jet being required to accelerate the water in the slurry in addition to the abrasives therein. The inefficient slurry acceleration also subjects the system to substantial component wear and reliability problems because the system uses additional energy to accelerate the water that forms part of the slurry. Such systems may require additional pumps to assist in accelerating the slurry, which in turn requires additional pump controls to maintain pressure.

Other conventional solutions include eductors that receive a fluid jet exit tube and have one abrasive feed channel that extends into the eductor and integrates with the fluid jet exit tube bore, from which the high-pressure liquid-abrasive mixture exits the system. The high-pressure liquid jet also enters the fluid jet exit tube, mixing with the abrasives inside the fluid jet exit tube bore as they travel therethrough.

Since in these systems the high-pressure liquid and abrasives mix only when they travel through the fluid jet exit tube, the space in which the two mix is limited, which may result in inadequate mixing and limited choice of abrasive form. The abrasives used in these systems typically are either dry abrasives or slurries, which exhibit the problems discussed above.

Accordingly, there is a need for a fluid jet system and method that machines or cuts at a kerf width of less than 0.015 inches, exhibits efficient abrasive acceleration, substantially prevents clogging in the system, and does not require substantially drying the abrasives when recycling.

BRIEF SUMMARY OF THE INVENTION

According to one embodiment, an orifice mount assembly for use in a high-pressure fluid jet system includes a mount body having a high-pressure fluid bore therethrough configured to communicate high-pressure fluid and an abrasive bore open to at least one side of the mount body and configured to communicate an abrasive mixture to at least a portion of the high-pressure fluid bore, a first end sealingly receiving a jewel orifice having a pressure-generating bore, a second end sealingly receiving a thin kerf mixing tube, and a first mixing area positioned upstream of the second end and comprising at least a portion of the high-pressure fluid and abrasive bores, the first mixing area being configured to allow the high-pressure fluid and the abrasive mixture to at least partially mix before entering a bore of the thin kerf mixing tube.

According to one aspect of the above embodiment, a distance between a downstream exit end of the pressure-generating bore of the jewel orifice and an upstream entry end of the bore of the thin kerf mixing tube is less than approximately 0.5 inches. According to one aspect of the above embodiment, a diameter of the thin kerf mixing tube bore is less than 0.015 inches.

According to another embodiment, a fluid jet system comprises a mount body having a high-pressure fluid bore therethrough configured to communicate high-pressure fluid and an abrasive bore open to at least one side of the mount body and configured to communicate an abrasive mixture to at least a portion of the high-pressure fluid bore, a first end sealingly receiving a jewel orifice having a pressure-generating bore, a second end sealingly receiving a thin kerf mixing tube, and a first mixing area positioned upstream of the second end and comprising at least a portion of the high-pressure fluid and abrasive bores, the first mixing area being configured to allow the high-pressure fluid and the abrasive mixture to at least partially mix before entering the thin kerf mixing tube, and an upstream high-pressure body including a high-pressure bore in fluid communication with the pressure-generating bore and the high-pressure fluid bore when the fluid jet system is in operation.

According to yet another embodiment, a pressure-generating body for use in a high-pressure fluid jet system includes a body having a high-pressure fluid bore therethrough and an abrasive bore open to at least one side of the body and configured to communicate an abrasive mixture to at least a portion of the high-pressure fluid bore, a first end including a pressure-generating bore, a second end sealingly receiving a thin kerf mixing tube, and a first mixing area positioned upstream of the second end and comprising at least a portion of the high-pressure fluid and abrasive bores, the first mixing area being configured to allow the high-pressure fluid and the abrasive mixture to at least partially mix before entering the thin kerf mixing tube.

According to one aspect of the above embodiment, the body, pressure-generating bore, and the thin kerf mixing tube are formed from a unitary body of material. According to one aspect of the above embodiment, the pressure-generating body is in form of a cartridge configured to be inserted or removed from a fluid jet assembly having an opening configured to securely receive the cartridge.

According to still another embodiment, a mount assembly for use in a high-pressure fluid jet system having an upstream high-pressure body including a high-pressure bore, comprises a thin kerf mixing tube having a high-pressure fluid bore therethrough, a pressure-generating bore formed toward an upstream end of the thin kerf mixing tube and configured to fluidly communicate with the high-pressure bore and the high-pressure fluid bore, and an abrasive-fluid jet bore formed in a downstream portion of the thin kerf mixing tube in fluid communication with the high-pressure fluid bore, the pressure-generating bore, high-pressure fluid bore, and abrasive-fluid jet bore having a longitudinal axis substantially parallel to a longitudinal axis of the high-pressure bore, a mount body having an abrasive bore open to at least one side of the mount body and configured to communicate an abrasive mixture to at least a portion of the high-pressure fluid bore, the mount body sealingly receiving the thin kerf mixing tube, and a first mixing area positioned upstream of the abrasive-fluid jet bore and comprising at least a portion of the high-pressure fluid bore and the abrasive bore, the first mixing area being configured to allow the high-pressure fluid and the abrasive mixture to at least partially mix before entering the abrasive-fluid jet bore of the thin kerf mixing tube.

According to a further embodiment, an orifice mount assembly for use in a high-pressure fluid jet system having an upstream high-pressure body including a high-pressure bore, comprises a mount body having a first end, a second end, opposing the first end, a high-pressure fluid bore extending therebetween configured to communicate high-pressure fluid and having a longitudinal axis substantially parallel to a longitudinal axis of the high-pressure bore when installed in a high-pressure fluid jet system, and an abrasive bore open to at least one side of the mount body and configured to communicate an abrasive mixture to at least a portion of the high-pressure fluid bore, a thin kerf mixing tube portion formed from a unitary body of material with the mount body toward the second end and having a bore in fluid communication with at least a portion of the high-pressure fluid and abrasive bores, and a mixing area comprising at least an intersection of the high-pressure fluid and abrasive bores, and being configured to allow the high-pressure fluid and the abrasive mixture to at least partially mix before entering the bore of the thin kerf mixing tube.

According to one aspect of the above embodiment, the orifice mount assembly is in form of a cartridge configured to be inserted or removed from a fluid jet assembly having an opening configured to securely receive the cartridge.

According to yet a further embodiment, a method for machining or cutting material at a kerf width less than 0.015 inches with a high-pressure fluid jet system having an orifice mount assembly including a mount body, comprises providing a first bore through the mount body configured to communicate high-pressure fluid and a second bore through the mount body configured to communicate an abrasive mixture, providing a pressure-generating bore and a thin kerf mixing tube on opposing ends of the mount body, respectively, wherein a distance between a downstream end of the pressure-generating bore and an upstream end of a bore of the thin kerf mixing tube is less than about 0.5 inches, feeding the high-pressure fluid to the first bore and feeding the abrasive mixture to the second bore of the mount body, and mixing the high-pressure fluid and the abrasive mixture at least in a mixing area before the high-pressure fluid and abrasive mixture enter the bore of the thin kerf mixing tube.

According to still a further embodiment, a method of in-situ recycling of an abrasive mixture in a high-pressure fluid jet system operable to mix an abrasive mixture with high-pressure fluid in a mixing area and generate an abrasive-fluid jet through a thin kerf mixing tube, comprises catching at least a portion of the abrasive-fluid jet comprising an abrasive-fluid mixture exiting the thin kerf mixing tube in a catching device, filtering the caught abrasive-fluid mixture in a filtering device to separate and dispose debris and derive a filtered abrasive-fluid mixture, and directly pumping the filtered abrasive-fluid mixture into the fluid jet system to recycle the abrasive-fluid mixture.

BRIEF DESCRIPTION OF THE SEVERAL VIEWS OF THE DRAWING(S)

FIG. 2A is a side view of a portion of a fluid jet system for machining thin kerf widths according to another embodiment.

FIG. 2B is a cross-sectional view of a portion of the fluid jet system of FIG. 2A, viewed across section 2B-2B.

FIG. 4A is a side view of a portion of a fluid jet system for machining thin kerf widths according to another embodiment.

FIG. 4B is a cross-sectional view of a portion of the fluid jet system of FIG. 4A, viewed across section 4B-4B according to one aspect.

FIG. 4C is a cross-sectional view of a portion of the fluid jet system of FIG. 4A, viewed across section 4C-4C according to another aspect.

DETAILED DESCRIPTION OF THE INVENTION

Figure 1B:
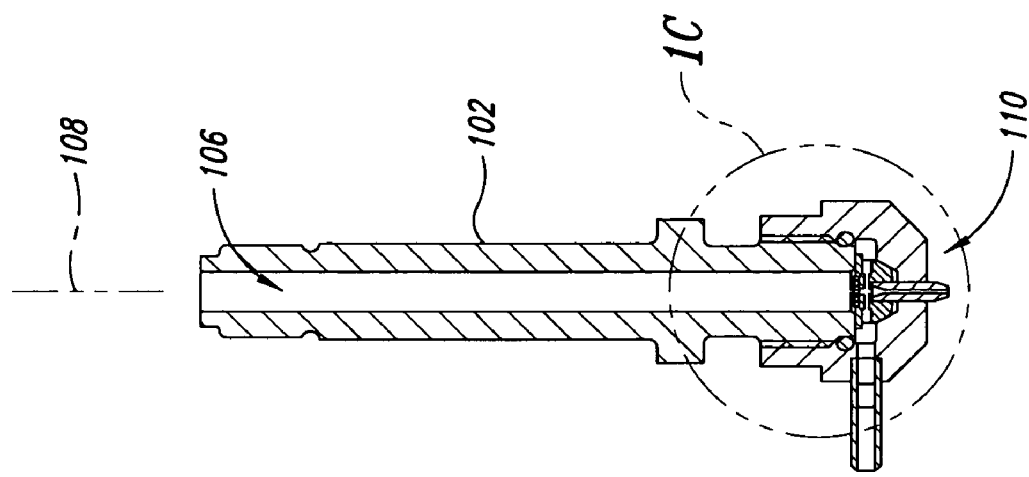
FIG. 1B is a cross-sectional view of the fluid jet system of FIG. 1A, viewed across section 1B-1B.
Figure 1A:
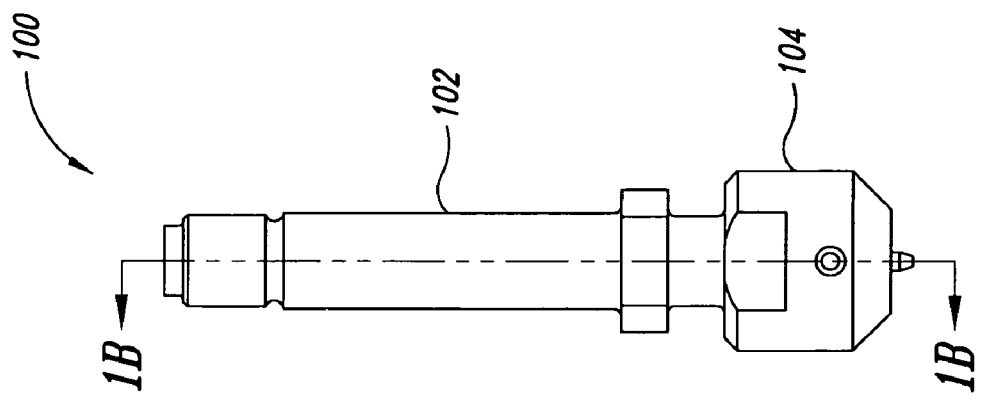
FIG. 1A is a side view of a fluid jet system for machining thin kerf widths according to one embodiment.

FIG. 1A illustrates a fluid jet system 100 for machining thin kerf widths according to one embodiment, comprising an upstream high-pressure body 102 coupled to a retaining nut 104. FIG. 1B is a cross-sectional view of the fluid jet system 100, which further comprises a high-pressure bore 106 formed in the upstream high-pressure body 102 and extending substantially parallel to a longitudinal axis 108. The fluid jet system 100 also comprises an orifice mount assembly 110, which as depicted in a detail view of FIG. 1C, includes a mount body 112 configured to sealingly receive a jewel orifice 113 toward an upstream end 116 of the mount body 112 and a thin kerf mixing tube 118 toward a downstream end 120 of the mount body 112. The mount body 112 can sealingly receive the jewel orifice 113 and the thin kerf mixing tube 118 via an interference fit, adhesives, bonding agents, sealing agents, a cylindrical seal fabricated from rubbers, plastics, silicone, elastics, composites, any combination thereof or any material capable of sealing an interface between the mount body 112 and the jewel orifice 113 against leaks.

The jewel orifice 113 can be fabricated from any material that can withstand fluid pressures up to and beyond 100,000 psi, such as sapphire and/or diamond. The jewel orifice 113 comprises a pressure-generating bore 114 that is in fluid communication with the high-pressure bore 106 and configured to generate a high-pressure fluid jet, which mixes with an abrasive mixture 101 downstream of the jewel orifice 113. The mount body 112 can be fabricated from any material that can withstand fluid pressures up to and beyond 100,000 psi. For example, the mount body 112 can be a material having 2% yield strength of above 100,000 psi, including stainless steel PH 15-5, PH 17-4, and 410/416. The thin kerf mixing tube 118 can be fabricated from any material that can transfer therethrough abrasive-fluid mixtures traveling at extremely high velocities and fluid pressures up to and beyond 100,000 psi. For example, the thin kerf mixing tube 118 can be fabricated from a carbide material.

Figure 1C:
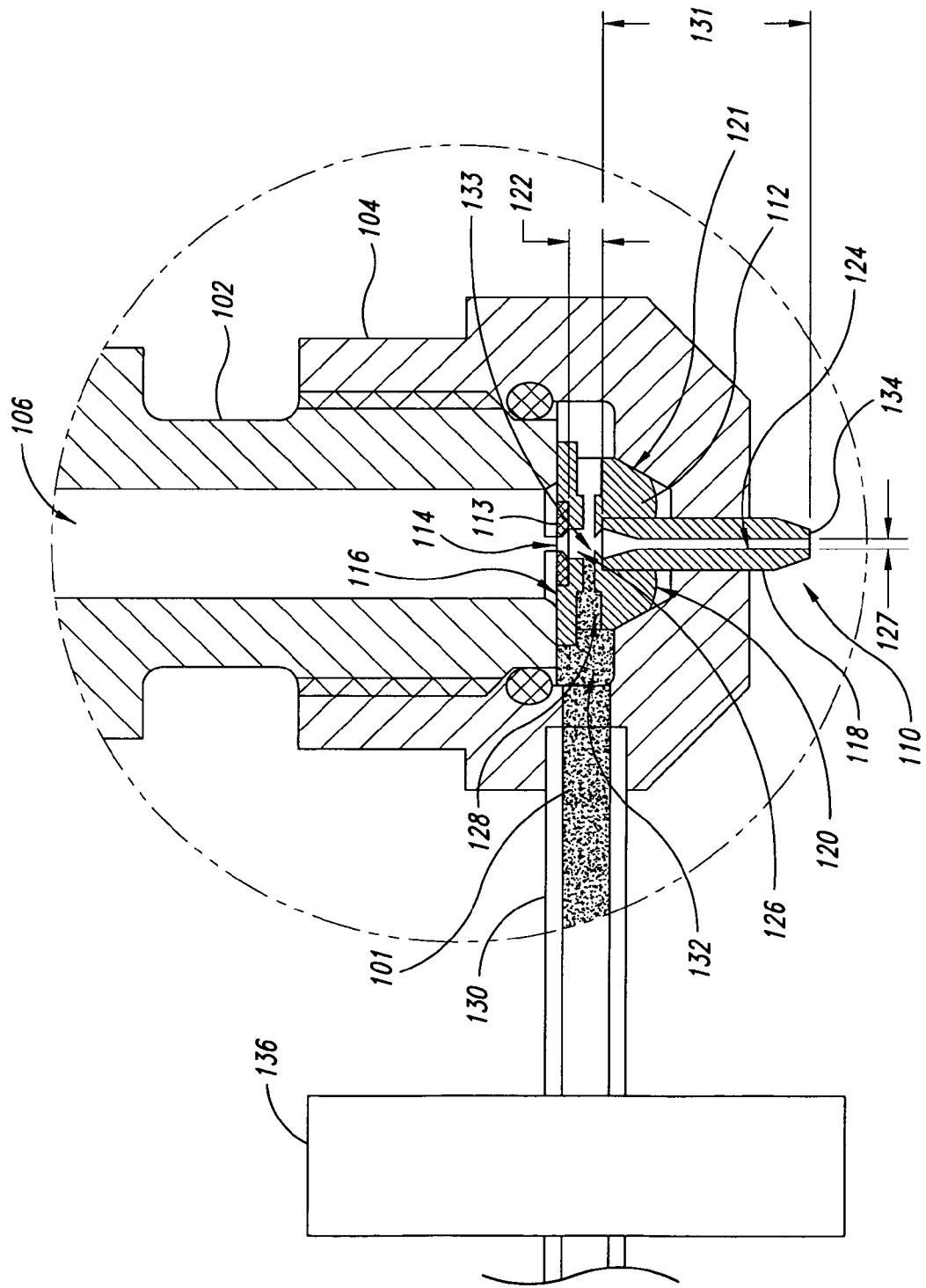
FIG. 1C is a detail view of a portion of the fluid jet system of FIG. 1B.

In the illustrated embodiment of FIG. 1C, the mount body 112 comprises a frustoconical boundary 121 converging downstream and configured to engage a surface of the upstream high-pressure body 102 and/or a surface of the retaining nut 104 to position, align and/or secure the mount body 112. For example, the high-pressure body 102 and the retaining nut 104 may be threadedly coupled such that tightening the retaining nut 104 against the high-pressure body 102 shifts the retaining nut 104 and the high-pressure body 102 toward each other until a portion of the retaining nut 104 engages the frustoconical portion 121 and a portion of the high-pressure body 102 engages a portion of the upstream end 116 of the mount body 112 to align and secure the orifice mount assembly 110 in place.

In contrast to conventional fluid jet systems, the fluid jet system 100 of the illustrated embodiment of FIGS. 1B and 1C incorporates the jewel orifice 113 and thin kerf mixing tube 118 on opposing ends 116, 120 of the mount body 112. Accordingly, a distance 122 between a downstream exit end of the pressure-generating bore 114 and an upstream end of a bore 124 of the thin kerf mixing tube 118 is minimized. For example, the distance 122 can be approximately 0.5 inches or less than 0.5 inches. Consequently, as the pressure-generating bore 114 forms the high-pressure fluid jet, the distance 122 at which the high-pressure fluid jet travels through a high-pressure fluid bore 126 formed in the mount body 112, before proceeding into the thin kerf mixing tube bore 124, is minimized.

Accordingly, jet spreading and other modes of dispersion of the high-pressure fluid jet associated with systems in which the jewel orifice and the mixing tube are farther apart are substantially alleviated. In contrast to conventional fluid jet systems, embodiments of the present invention are configured to incorporate the thin kerf mixing tube 118 with a thin kerf mixing tube bore 124 without experiencing jet-spreading problems. In one embodiment, the thin kerf mixing tube bore 124 includes a diameter 127 that is less than 0.015 inches, and in one embodiment, is between 0.003 and 0.012 inches. Since jet spreading is substantially alleviated as discussed above, the thin kerf mixing tube 118 captures substantially all of the abrasive-fluid mixture formed from the high-pressure fluid and the abrasive mixture 101. A length 131 of the thin kerf mixing tube can be designed to control the time interval during which the high-pressure fluid and abrasive mixture mix before exiting the fluid jet system 100. For example, in one embodiment, the length 131 can be between 0.2 inches and 1.10 inches, inclusive.

A diameter of the pressure-generating bore 114 can also be designed to obtain a desired pressure, velocity and/or width of the high-pressure fluid. For example, the diameter of the pressure-generating bore 114 can range from approximately 0.001 inches to 0.003 inches, inclusive.

Furthermore, the high-pressure fluid bore 126 of the mount body 112 extends substantially parallel to the longitudinal axis 108 (FIG. 1B) of the high-pressure bore 106, and in some embodiments, the high-pressure fluid bore 126, thin kerf mixing tube bore 124 and the pressure-generating bore 114 of the jewel orifice 113 include a substantially identical central axis substantially parallel to the longitudinal axis 108 of the high-pressure bore 106. Moreover, the mount body 112 includes an abrasive bore 128 open to at least one side of the mount body 112 and extending in any direction configured to communicate an abrasive mixture 101 to at least a portion of the high-pressure fluid bore 126 when the fluid jet system 100 is in operation. For example, the abrasive bore 128 may extend in a direction substantially perpendicular to the direction along which the high-pressure fluid bore 126 extends.

The fluid jet system 100 also includes a mixing area 133, formed by at least a portion of the high-pressure fluid and abrasive bores 126, 128, upstream of the bore 124 of the thin kerf mixing tube 118. Accordingly, the high-pressure fluid entering through the pressure-generating bore 114 and high-pressure fluid bore 126, and the abrasive mixture 101 entering through the abrasive bore 128, can mix in the mixing area 133 prior to entering the bore 124 of the thin kerf mixing tube 118. After the high-pressure fluid and abrasive mixture 101 at least partially mix in the mixing area 133, they enter the bore 124 of the thin kerf mixing tube 118 to further mix therein. A resulting abrasive-fluid jet with substantially consistent flow and composition qualities exits from a downstream exit end 134 of the thin kerf mixing tube 118. Since, the high-pressure fluid and abrasive mixture 101 mix before entering the bore 124 of the thin kerf mixing tube 118, inadequate mixing problems associated with conventional systems in which mixing occurs only in the jet exit tube, are alleviated.

When the fluid jet system 100 is in operation, a source 130 of the abrasive mixture 101 feeds the mixture to an entry port 132 in fluid communication with the abrasive bore 128 of the mount body 112. In one embodiment, the abrasive mixture comprises flow qualities of a paste to prevent clogging of the system 100 in locations such as in the bore 124 of the thin kerf mixing tube 118. For example, the abrasive mixture 101 can be wet and dense such that it is substantially incapable of flowing on its own, requiring an external force to induce the abrasive-mixture to flow. In one embodiment, the abrasive mixture 101 exhibits paste qualities when the abrasive mixture 101 includes an abrasive to water mass ratio of at least approximately 20 percent. Additionally, or alternatively, the abrasive paste may contain a mixture of abrasives and water such that, in each minute during which the fluid jet system is operating, approximately 1 to 1.5 pounds of abrasives exit the fluid jet system for every gallon of water that exits the fluid jet system 100.

As discussed above, conventional systems employing an eductor, generally are not amenable to receiving abrasives in paste form because the eductors lack a chamber upstream of the jet exit tube in which the high-pressure fluid and abrasives mix. In the case of the eductors, the high-pressure liquid mixes with abrasives only in the bore of the jet exit tube received by the eductor. Therefore, when abrasives are fed into such systems in paste form, the high-pressure liquid may not adequately mix with the abrasives before exiting the jet exit tube, resulting in chunks of abrasive paste being pushed out by the high-pressure fluid.

Furthermore, conventional systems typically require abrasives in dry or slurry form for the high-pressure liquid to adequately mix with the abrasives in the short time and the limited space in which the high-pressure liquid and the abrasives meet before exiting the system. Consequently, these systems are subject to the problems discussed above with respect to using dry abrasives or abrasive slurries. Accordingly, even systems that presently employ wet abrasives, use abrasive slurries, which typically contain excess liquid. For example, the abrasive slurries include an abrasive to liquid mass ratio less than a threshold abrasive to liquid mass ratio at which the abrasive-liquid mixture can flow without an external force applied to the abrasive-liquid mixture. Since the abrasive-liquid mixture of conventional systems can flow on its own, abrasive particles can gain momentum from the water jet, contributing to inaccurate machining and/or a widening of the kerf width of the exiting abrasive-fluid jet. As discussed above, the water jet in systems using abrasive slurries are required to accelerate both the water and the abrasives in a slurry, resulting in poor acceleration and reduced efficiency of the system.

Conversely, embodiments of the present invention can accommodate an abrasive paste to alleviate problems with slurries and dry abrasives because the mixing area 133 provided inside the mount body 112 allows the high-pressure fluid and abrasive mixture 101 to mix before entering the mixing tube 118, and the distance 122 between the pressure-generating bore 114 and the mixing tube 118 is minimized. Using an abrasive paste that is substantially incapable of independently flowing is thus desired because it maintains pressure in the abrasive bore 128 and responds to air pressure to advance toward and mix with the high-pressure fluid traveling through the high-pressure fluid bore 126. For example, the abrasive paste can be biased to flow and feed into the mixing area 133 in the mount body 112 by using air pressure through a suitable pump. Additionally or alternatively, a vacuum-assist source may pull the abrasive mixture 101 into the mixing area 133.

Accordingly, a substantially consistent amount of abrasives can be fed to the system 100 in the form of paste or wet dense abrasives without clogging the system and/or compromising an efficiency level at which the abrasive-fluid jet is formed. Additionally, the system 100 is subject to less component wear and requires less power to accelerate the abrasive mixture as compared to conventional systems because the liquid content of the abrasive mixture 101 exhibiting paste qualities is less than the liquid content of abrasive slurries.

Additionally, or alternatively, the abrasive mixture may comprise dense abrasive foam formed by a foaming process prior to feeding the abrasive mixture 101 into the mixing area 133. For example, an abrasive mixture or paste 101 can be combined, mixed, and/or blended with a foaming agent to produce an abrasive foam, which does not flow without the assistance of a biasing force to move it toward the high-pressure fluid bore 126. The abrasive foam is fed or injected into the abrasive bore 128, accurately introducing the desired amount of abrasives to the mixing area 133. Since foaming agents are typically lightweight, their addition to the abrasive mixture 101 will not harmfully impact the fluid jet and/or a flow characteristic thereof.

In the embodiments discussed herein, an optional polymer in liquid or visco-elastic media can also be used as abrasive carriers to further enhance the flow of the abrasive mixture 101.

Furthermore, a solid-to-fluid ratio of the abrasive mixture 101 can be controlled and/or adjusted by routing the abrasive mixture 101 from the abrasive-fluid source 130 through a catching and filtering unit 136. The catching and filtering unit 136 is configured to filter the abrasive mixture 101 by discriminating based on particle size, preventing solids larger than a predetermined size in the abrasive mixture 101 to pass toward the mixing area 133. Additionally, or alternatively, the catching and filtering device can be configured to filter unwanted particles by hydro-classification (i.e., by their floating properties in liquid).

Clogging of the high-pressure fluid jet system 100 is substantially eliminated because the distance 122 between the downstream exit end of the pressure-generating bore 114 and the upstream end of the thin kerf mixing tube bore 124 is minimized and the abrasive mixture 101 is efficiently fed to the mixing area 133. The abrasive mixture 101 and the high-pressure fluid rapidly mix in the mixing area 133 and the thin kerf mixing tube bore 124, and exit from the thin kerf mixing tube bore 124.

FIG. 2A illustrates a fluid jet system 200 for machining thin kerf widths according to another embodiment. FIG. 2B illustrates a cross-sectional view of a portion of the high-pressure fluid jet system 200, which comprises a pressure-generating body 210 including a body 212, a pressure-generating bore 214 and a thin kerf mixing tube portion 218, all formed from a unitary body of material. The pressure-generating body 210 includes a high-pressure fluid bore 226 and an abrasive bore 228, configured to respectively deliver high-pressure fluid and an abrasive mixture, such as an abrasive paste or foam, to mix within a mixing area 233. The mixing area 233 includes at least a portion of the high-pressure fluid bore 226 and abrasive bore 228, and is positioned upstream of a bore 224 of the thin kerf mixing tube portion 218. When in operation, the abrasive mixture is fed to the abrasive bore 228 via an abrasive port 232 that is in fluid communication with the abrasive bore 228. The high-pressure fluid bore 226 extends longitudinally through the body 212. The bore 224 of the thin kerf mixing tube portion 218 and the high-pressure fluid bore 226 at least partially align.

Although in the illustrated embodiment of FIG. 2B, the high-pressure fluid bore 226 and the bore 224 of the thin kerf mixing tube portion 218 form a unitary bore, in other embodiments, the two bores 224, 226 may have distinct sizes, diameters and/or end geometries. For example, the bore 224 of the thin kerf mixing tube portion 218 may include a frustoconical entry diverging upstream and including an upstream end wider than a downstream end of the high-pressure fluid bore 226 to capture an entirety of the abrasive-fluid jet exiting the mixing area 233 and entering the bore 224 of the thin kerf mixing tube portion 218. The resulting abrasive-fluid jet further mixes and exits the fluid jet system 200 through the bore 224 of the thin kerf mixing tube portion 218, which at least toward an exit end thereof includes a diameter 227 of less than 0.015 inches.

The pressure-generating body 210 or at least a portion thereof is fabricated from material having high hardness values because the pressure-generating bore 214 is formed in the body 212 and a separate jewel orifice is lacking in this embodiment. For example, the pressure-generating body 210 may be fabricated from a material comprising a composite of tungsten carbide (WC), vanadium carbide (VC) and/or molybdenum carbide ($Mo_2C$). One example of such a composite is ROCTEC® sold through BORIDE®. ROCTEC® is a very fine-grain tungsten carbide material.

In some embodiments, a diamond coating can be applied to at least a portion of the pressure-generating bore 214 and/or a top surface of the pressure-generating body 210 proximate the pressure-generating bore 214. Additionally, or alternatively, the pressure-generating body 210 or a portion thereof can be fabricated from polycrystalline diamond (PCD).

The pressure-generating body 210 being formed from a unitary body of material substantially eliminates a need for seals between an orifice mount and a separate jewel orifice and/or mixing tube, making it easier to assemble and disassemble the fluid jet system 200 for maintenance, cleaning or any other purpose.

Figure 3B:
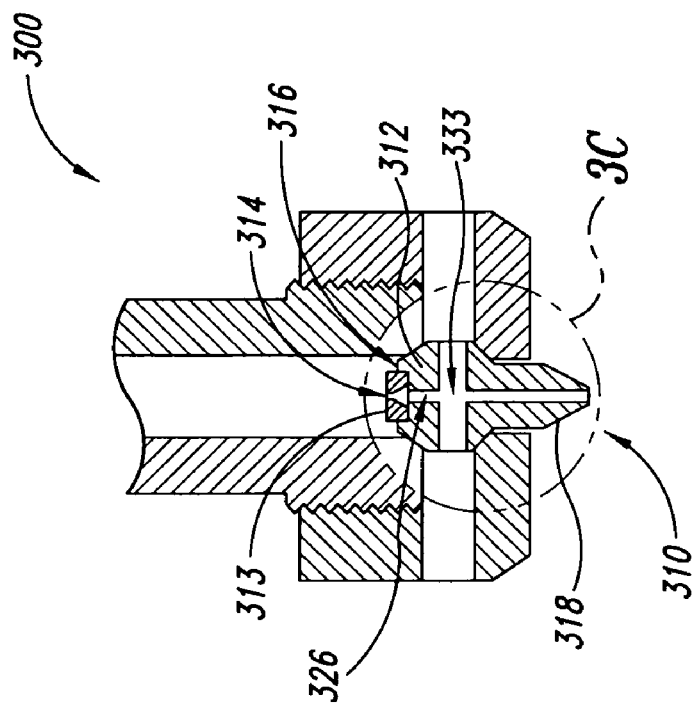
FIG. 3B is a cross-sectional view of a portion of the fluid jet system of FIG. 3A, viewed across section 3B-3B.
Figure 3A:
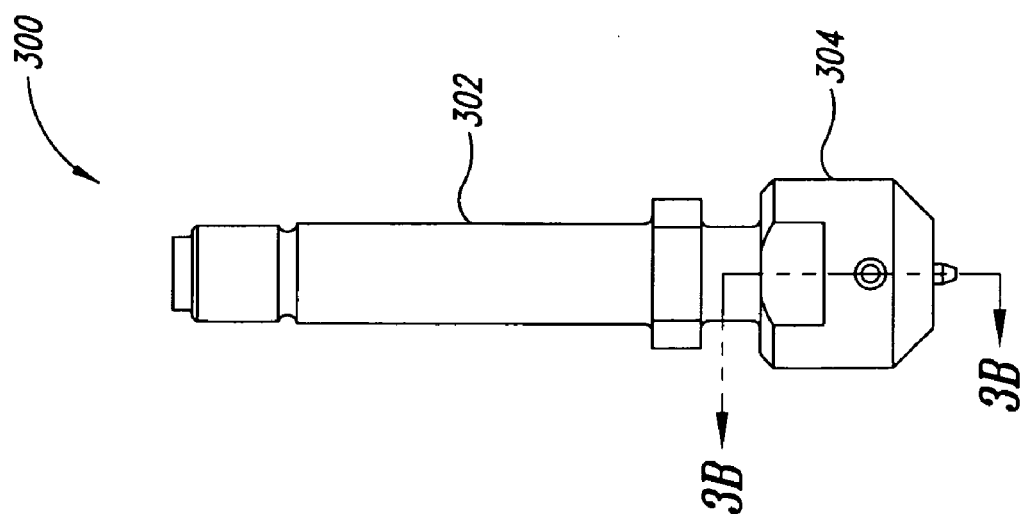
FIG. 3A is a side view of a portion of a fluid jet system for machining thin kerf widths according to another embodiment.
Figure 3C:
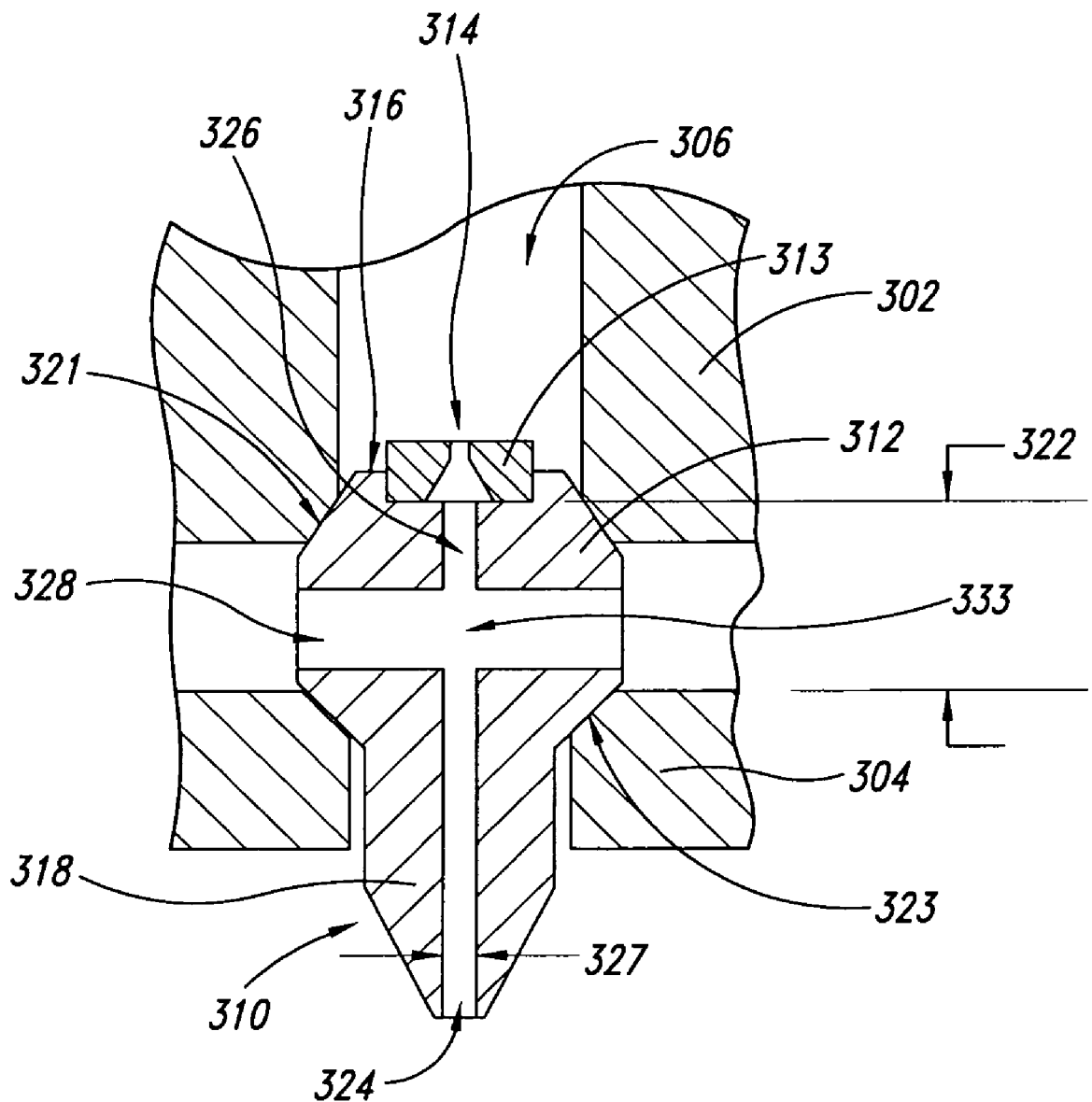
FIG. 3C is a detail view of a portion of the fluid jet system of FIG. 3B.

FIG. 3A illustrates a fluid jet system 300 for machining thin kerf widths according to another embodiment comprising an upstream high-pressure body 302 coupled to a retaining nut 304. FIGS. 3B and 3C illustrate a cross-sectional view of a portion of the high-pressure fluid jet system 300, which comprises a mount assembly 310 including a mount body 312 having a high-pressure fluid bore 326 and a thin kerf mixing tube portion 318 having a bore 324, the mount body 312 and the thin kerf mixing tube portion 318 being formed from a unitary body of material. The mount assembly 310 further comprises a jewel orifice 313 sealingly received in the mount body 312 toward an upstream end 316 thereof, the jewel orifice 313 having a pressure-generating bore 314, as more clearly viewed in a detail view in FIG. 3C. The pressure-generating bore 314 is configured to communicate fluid flow between a high-pressure bore 306 of the high-pressure body 302 and the high-pressure fluid bore 326. For example, a portion of the pressure-generating bore 314 may be cylindrical without a taper and another portion, frustoconical and diverging downstream.

The mount body 312 further comprises an abrasive bore 328 configured to deliver an abrasive mixture to mix with a high-pressure fluid received through the high-pressure fluid bore 326. The abrasive mixture and high-pressure fluid mix within a mixing area 333, which includes at least a portion of the high-pressure fluid bore 326 and the abrasive bore 328, prior to a resulting abrasive-fluid jet passing a lower boundary of the abrasive bore 328 in a downstream direction and entering the bore 324 of the thin kerf mixing tube portion 318. The abrasive-fluid jet subsequently travels through the bore 324 of the thin kerf mixing tube portion 318, and then exits the system from the bore 324, which at least toward an exit end thereof comprises a diameter 327 of less than 0.015 inches to cut material at a kerf width of less than 0.015 inches when the mount assembly 310 is installed in the fluid jet system 300 and the fluid jet system 300 is in operation. Again, thin kerf widths of less than 0.015 inches are achievable by the fluid jet system 300 for reasons including the high-pressure fluid exiting the pressure-generating bore 314 of the jewel orifice 313, and substantially immediately thereafter, entering the high-pressure fluid bore 326 and the bore 324 of the thin kerf mixing tube portion 318. The diameter of the abrasive bore 328 can be sized to allow the abrasive mixture to adequately mix with the high-pressure fluid.

For example, the diameter of the abrasive bore 328 can be sized to minimize a distance 322 between the pressure-generating bore 314 and a portion of the high-pressure fluid bore 326 coinciding with an upstream end of the thin kerf mixing tube portion 318. For example, the diameter of the abrasive bore 328 in one embodiment is less than 0.5 inches. Moreover, as discussed above, clogging is also substantially alleviated when the abrasive mixture is an abrasive paste or foam.

Furthermore, the orifice mount assembly 310 alleviates the need for seals between a separate mount body and a separate mixing tube, making it easier to assemble and disassemble the fluid jet system 300 for maintenance, cleaning and/or any other purpose. The orifice mount assembly 310 may sealingly receive the jewel orifice 313 using an interference fit, adhesives, bonding agents, sealing agents, and/or a ring or seal fabricated from natural and/or synthetic rubbers, silicone, plastics, elastics, composites, any combination thereof, or any other material configured to seal an interface between the orifice mount body 312 and the jewel orifice 313 against leaks.

In addition, material and fabrication of the jewel orifice 313 can be optimized to best suit distinct applications of the fluid jet system 300 because the jewel orifice 313 is a separate part. Furthermore, this configuration allows use of different jewel orifices 313 having different properties such as different dimensions or materials that best suit an application of the high-pressure fluid jet system.

The mount body 312 may comprise a frustoconical boundary 321 converging upstream and configured to engage a surface of the upstream high-pressure body 302 and/or a surface of the retaining nut 304 to position, align and/or secure the mount body 312. Additionally, or alternatively, the mount body 312 may comprise a frustoconical boundary 323 converging downstream and configured to engage a surface of the upstream high-pressure body 302 and/or a surface of the retaining nut 304 to position, align and/or secure the mount body 312.

In one embodiment as illustrated in FIG. 3B, the retaining nut 304 threadedly receives the high-pressure body 302, such that tightening the retaining nut 304 against the high-pressure body 302 aligns and secures the mount body 312 and/or the orifice mount assembly 310. Upon tightening the retaining nut 304, an inner surface of the high-pressure body 302 and/or retaining nut 304 engages the boundaries 321, 323 of the orifice mount assembly 310 to position, align and/or secure the orifice mount assembly 310.

FIG. 4A illustrates a fluid jet system 400 for machining thin kerf widths according to another embodiment comprising an upstream high-pressure body 402, including a high-pressure bore 406 (FIG. 4B), coupled to a retaining nut 404.

FIG. 4B illustrates a cross-sectional view of a portion of the fluid jet system 400 according to one aspect, in which the fluid jet system 400 comprises an orifice mount assembly 410 including a mount body 412 and a pressure-generating bore 414 formed in a thin kerf mixing tube 418. The pressure-generating bore 414 fluidly communicates with the high-pressure bore 406 positioned upstream of the pressure-generating bore 414. Moreover, the pressure-generating bore 414 is also in fluid communication with a high-pressure fluid bore 426, formed in the thin kerf mixing tube 418 downstream of the pressure-generating bore 414. The mount body 412 may comprise a frustoconical boundary 423 converging downstream and configured to engage a surface of the upstream high-pressure body 402 and/or a surface of the retaining nut 404 to position, align and/or secure the mount body 412, similar to the embodiments above.

Furthermore, the pressure-generating bore 414 is formed toward an upstream end of the thin kerf mixing tube 418. The mount body 412 sealingly receives the thin kerf mixing tube 418 by any suitable means, such as an interference fit, adhesives, bonding agents, sealing agents, a cylindrical seal fabricated from rubbers, plastics, silicone, elastics, composites, any combination thereof or any material capable of sealing an interface 438 between the mount body 412 and the thin kerf mixing tube 418 against leaks.

Additionally, or alternatively, in any of the embodiments discussed herein, a collet or an o-ring (not shown) that can be tightened about at least a portion of the thin kerf mixing tube 418 can be used to assist in retaining the thin kerf mixing tube 418.

The mount body 412 includes an abrasive bore 428 configured to deliver an abrasive mixture to mix with the high-pressure fluid in a mixing area 433. The abrasive mixture can be in form of paste or foam as discussed above. The mixing area 433 includes at least a portion of the high-pressure fluid bore 426 and at least a portion of the abrasive bore 428.

Furthermore, the thin kerf mixing tube 412 includes an abrasive-fluid jet bore 424 formed in a downstream portion thereof, through which an abrasive-fluid jet travels and further mixes, exiting the abrasive-fluid jet bore 424 from a downstream end thereof. In one embodiment, the mixing area 433 includes at least an intersection of the high-pressure and abrasive bores 426, 428 and a portion of each of the bores 426, 428 proximate the intersection thereof. Furthermore, the mixing area 433 is positioned upstream of the abrasive-fluid jet bore 424. As illustrated in FIG. 4B, the abrasive-fluid jet bore 424 is cylindrical and terminates upstream at a narrow end of a frustoconical portion of the high-pressure fluid bore 426 formed in a downstream portion thereof and diverging upstream.

Consequently, the abrasive mixture and high-pressure fluid at least partially mix in the mixing area 433 before entering the abrasive-fluid jet bore 424. The abrasive-fluid jet bore 424 comprises a diameter 427 of less than 0.015 inches at least toward an exit end thereof, to cut material at a kerf width of less than 0.015 inches when the orifice mount assembly 410 is installed in the fluid jet system 400 and the fluid jet system 400 is in operation.

Furthermore, the high-pressure fluid bore 426 comprises a central longitudinal axis substantially parallel to a central longitudinal axis 408 of the high-pressure bore 406. At least a portion of the high-pressure fluid bore 426 and the abrasive-fluid jet bore 424 may be aligned with the pressure-generating bore 414 and shaped to efficiently route a high-pressure fluid therethrough. For example, the high-pressure fluid bore 426 may be cylindrical and wider than the pressure-generating bore 414 to capture an entirety of the high-pressure fluid jet.

In one embodiment, the high-pressure fluid bore 426 may form the frustoconical portion toward the downstream region of the high-pressure fluid bore 426, the frustoconical portion converging downstream and terminating at the upstream longitudinal boundary of the abrasive-fluid jet bore 424. Accordingly, even if the high-pressure fluid and/or the abrasive-fluid jet were to experience some dispersion or spreading, the high-pressure fluid and/or the abrasive-fluid jet are contained and narrowed as they travel through the frustoconical portion and the abrasive-fluid jet bore 424. Accordingly, excess fluid and/or abrasive-fluid mixture will not tend to collect in the mixing area 433.

Similar to embodiments discussed above, close proximity of the pressure-generating bore 414 and abrasive-fluid jet bore 424 combined with the geometry of the pressure-generating bore 414 and high-pressure fluid bore 426 make it possible to utilize the thin kerf mixing tube 418 comprising the abrasive-fluid jet bore 424 having a 0.015 inch or less diameter. Furthermore, using a foam or paste abrasive mixture will also substantially alleviate clogging and/or inefficient abrasive acceleration in the system.

In some embodiments, the high-pressure fluid jet system includes an optional exit port 440. Excess fluid and/or abrasive-fluid mixture that may compile in the mixing area 433 can be flushed through the exit port 440 to be disposed as waste, recycled into the entry port and/or stored for future use. This can be accomplished by using a pump or a vacuum assist device 446 (FIG. 4A).

FIG. 4C illustrates a cross-sectional view of the high-pressure fluid-jet system 400 of FIG. 4A according to another aspect, in which an orifice mount assembly 411 comprises a mount body 409. According to this aspect, the high-pressure fluid jet system 400 comprises at least one optional vent bore 415 open to at least one side of the mount body 409. The vent bore 415 is not bound by or engaged against the upstream high-pressure body 407 and/or the retaining nut 405. Alternatively, the vent bore 415 can be aligned with a bore in the upstream high-pressure body 407 and/or retaining nut 405 open to a surrounding environment and/or an air supply source as illustrated in FIG. 4C.

The vent bore 415 forms an air vent configured to draw air into a mixing area 433 including at least a portion of a high-pressure fluid jet bore 435 and an abrasive bore 437 of the mount body 409. Drawing air into the mixing area 433 can substantially prevent backflow of high-pressure fluid and/or fluid-abrasive mixture toward a pressure-generating bore 414 of a jewel orifice 413, sealably received in an upstream portion of the mount body 409. The vent bore 415 may also aerate the abrasive-fluid mixture for improved performance.

Furthermore, the high-pressure fluid bore 435 of the mount body 409 terminates at an upstream end 417 thereof, which includes a diameter larger than a diameter of a downstream end 419 of the pressure-generating bore 414 to efficiently stream the high-pressure fluid jet from the pressure-generating bore 414 to the high-pressure fluid bore 426 and then to the thin kerf mixing tube bore 424. The thin kerf mixing tube bore 424 comprises a diameter 427 of less than 0.015 inches at least toward a downstream end thereof, to machine and/or cut material at a kerf width of less than 0.015 inches as discussed above.

In some embodiments, the mount body 409 may comprise a cylindrical downstream portion 425 sealingly surrounding at least a portion of an outer surface 429 of the thin kerf mixing tube 418. This configuration provides improved stability of the thin kerf mixing tube 418, which may be desirable in applications demanding abrupt motions of the thin kerf mixing tube 418. These applications include those that require accurate contours under aggressive movement of the fluid jet system 400. The mount body 409 sealingly receives the thin kerf mixing tube 418 via an interference fit, adhesives, bonding agents, sealing agents, a cylindrical seal fabricated from rubbers, plastics, silicone, elastics, composites, any combination thereof or any other material capable of sealing an interface between the mount body 409 and the thin kerf mixing tube 418 against leaks.

As shown in FIG. 4A, in some embodiments, the high-pressure fluid jet system 400 may comprise additional components for in-situ recycling of abrasives or the abrasive-fluid mixture. For example, the system 400 may comprise the vacuum assist device 446 for routing excess abrasives or fluid-abrasive mixture from a location in the system 400 including the mixing area 433 to a pump device 448. The pump device 448 is configured to recycle the extracted abrasive-fluid mixture back into the system through the abrasive bore 428.

The high-pressure fluid jet system 400 may further comprise a catcher 450 configured to capture the high-pressure abrasive-fluid jet exiting the thin kerf mixing tube 418 and route the abrasive-fluid mixture to a filtering device 452 to separate and dispose debris that may have entered the caught mixture after cutting and/or machining. If a more dry abrasive-fluid mixture is desired to be recycled back into the fluid jet system 400, the fluid jet system 400 may further comprise an optional conditioning device 454 configured to at least partially remove liquids such as water from the caught fluid-abrasive mixture. However, in some embodiments of the present invention, the conditioning process to dry the abrasives is either not necessary or the abrasives need not be completely dried because the fluid jet system 400 is configured to receive and process wet dense abrasives or abrasive paste as discussed above. This is in contrast to most conventional fluid jet systems that use dry abrasives or abrasive slurries. Conventional systems typically require dry abrasives to be fed into the conventional system or to be used for making new slurries.

Subsequently, the filtered and/or conditioned abrasives can be directly recycled back into the system 400 via the pump 448. The filtering of the abrasive-fluid mixture can be achieved through discriminating against particles and debris based on their size and/or by using hydro-classification to separate unwanted particles based on their floating behavior in a liquid such as water.

Figures 5A, 5B:
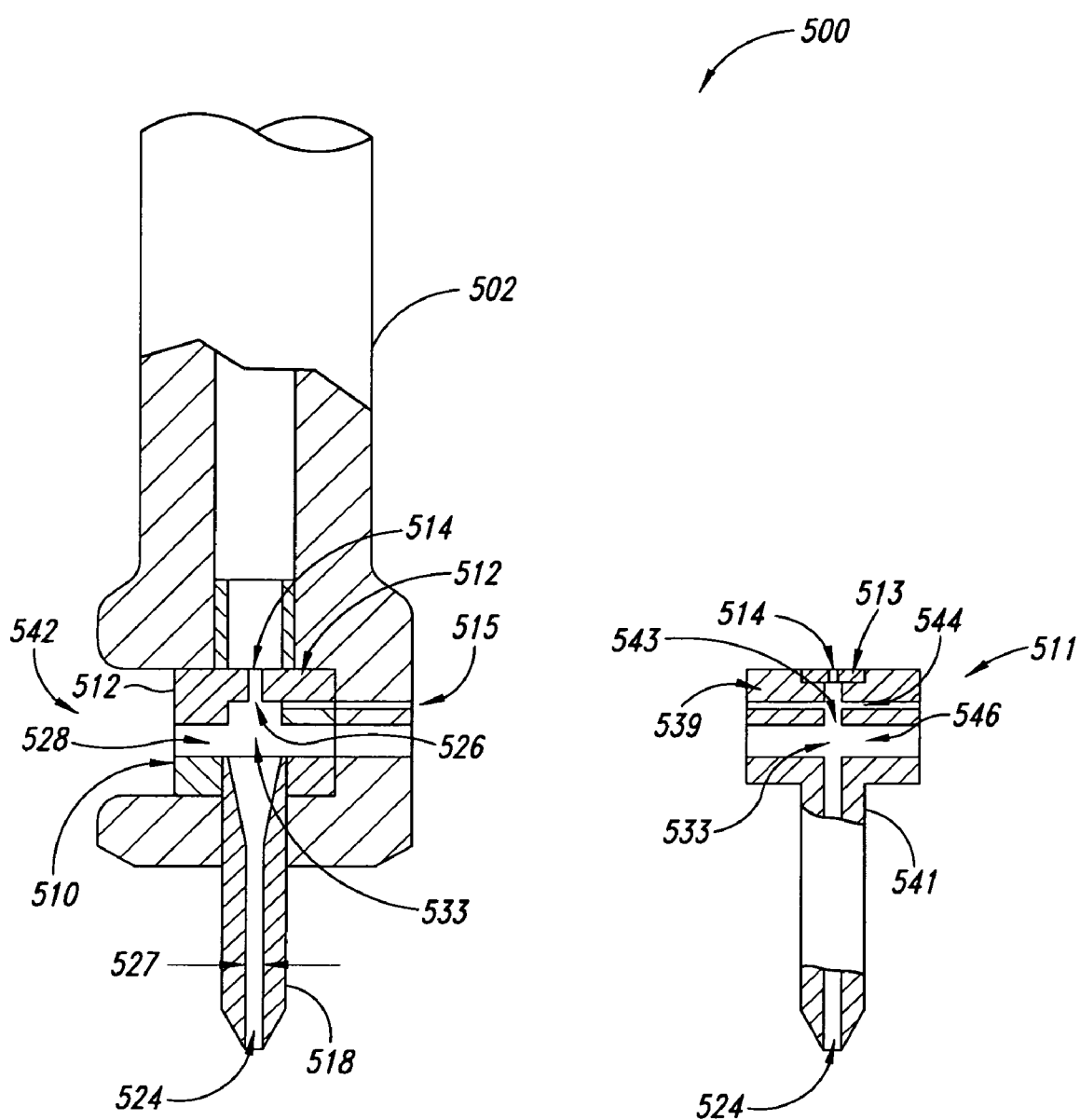
FIG. 5A is a side cutaway view of a portion of a fluid jet system according to a further embodiment, including an orifice mount assembly according to one aspect.
FIG. 5B is a side view of an orifice mount assembly of the fluid jet system of FIG. 5A according to another aspect.

FIG. 5A illustrates a cut-away view of a portion of a high-pressure fluid jet system 500 for machining thin kerf widths according to another embodiment comprising an upstream high-pressure body 502 and a pressure-generating cartridge 510 including a body 512, a pressure-generating bore 514 and a thin kerf mixing tube 518 having a bore 524.

According to one aspect illustrated in FIG. 5A, the pressure-generating bore 514 is formed toward an upstream end of the body 512, eliminating a separate jewel orifice. The body 512 sealingly and captively receives the thin kerf mixing tube 518 toward a downstream portion thereof via an interference fit, adhesives, bonding agents, sealing agents, a cylindrical seal fabricated from rubbers, plastics, silicone, elastics, composites, any combination thereof or any material capable of sealing an interface between the mount body 512 and the thin kerf mixing tube 518 against leaks.

FIG. 5B illustrates another aspect in which a pressure-generating cartridge 511 includes a mount body 539 having a thin kerf mixing tube portion 541, and a jewel orifice 513 including a pressure-generating bore 514 therethrough. In this aspect, a separate mixing tube is precluded, and the mount body 539 and thin kerf mixing tube portion 541 are formed from a unitary body of material.

As illustrated in FIGS. 5A and 5B, the pressure-generating cartridges 510, 511 are easily installable in or removable from the system 500 for cleaning and/or replacement or any other suitable purpose.

As illustrated in FIG. 5A, the upstream high-pressure body 502 includes an opening 542 on at least one side thereof, accommodating easy insertion and removal of the pressure-generating cartridges 510, 511, respectively, in the upstream high-pressure body 502. High-pressure fluid and abrasive mixture respectively enter the pressure-generating cartridges 510, 511 through high-pressure fluid bores 526, 543 and abrasive bores 528, 546, respectively. The abrasive mixture and high-pressure fluid mix in a mixing area 533, which includes at least a portion of the high-pressure fluid bores 526, 543 and the abrasive bores 528, 546. The mixing area 533 is positioned upstream of the bore 524 of the thin kerf mixing tube 518 or the thin kerf mixing tube portion 541.

The high-pressure fluid and abrasive mixture mix in a similar fashion as discussed in conjunction with the embodiments above, prior to entering the thin kerf mixing tube 518 or thin kerf mixing tube portion 541. The resulting abrasive-fluid jet subsequently travels through and exits from the thin kerf mixing tube bore 524, at least a downstream exit portion of which comprises a diameter 527 of less than 0.015 inches. As illustrated in FIG. 5A, the fluid jet system 500 may comprise a vent bore 515 open to a surrounding environment and forming an air vent to aerate and prevent backflow of the mixture as discussed above.

Figure 6:
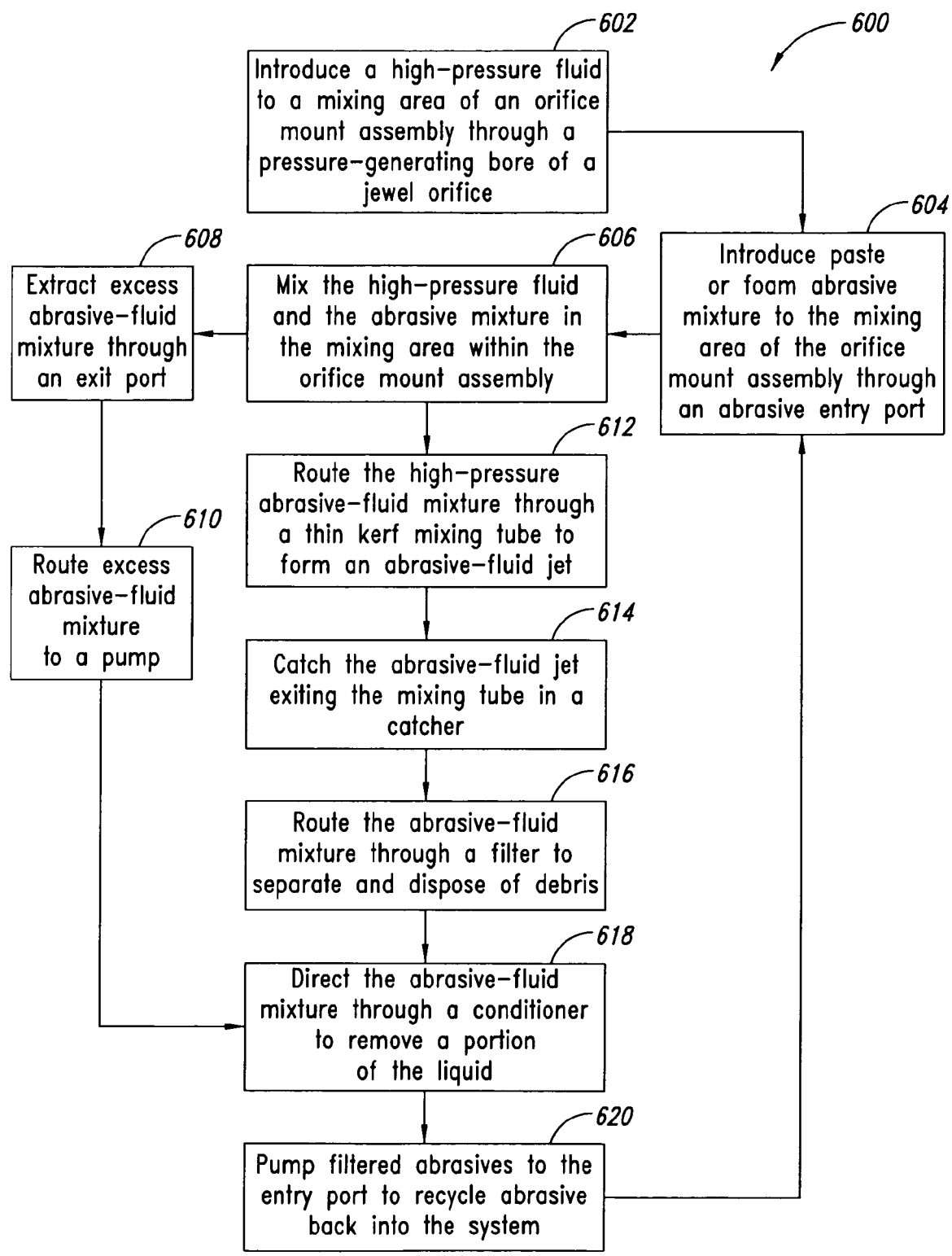
FIG. 6 is a flow chart illustrating a method for in-situ recycling of abrasives in a fluid jet system according to another embodiment.

FIG. 6 is a flow chart illustrating an example embodiment of a method 600 for in-situ recycling of at least a portion of the abrasives or abrasive-fluid mixture in a fluid jet system, such as that depicted in FIGS. 4A and 4B. More particularly, the method 600 comprises introducing a high-pressure fluid to a mixing area 433 in the orifice mount assembly 410, step 602. Abrasive mixture that is in a form of foam or paste is introduced to the mixing area 433 through the entry port 432, step 604. The high-pressure fluid and the abrasive mixture mix in the mixing area 433, the high-pressure fluid being generated as it passes through the pressure-generating bore 414 and the abrasive mixture entering the mixing area 433 through the abrasive bore 428, step 606.

Excess abrasive-fluid mixture can be optionally extracted from the mixing area 433 using a pump or vacuum assist device through the exit port 440, step 608. The excess abrasive-fluid mixture is routed to the filtering device 452, step 610. The excess abrasive-fluid mixture can optionally be routed through the conditioning device 454 to remove a portion of liquids therein, such as water, step 618. The filtered abrasives are recycled back into the system 400 through the entry port 432 via the pump 448, step 620.

The abrasive-fluid mixture that is not extracted from the mixing area 433 is routed through the thin kerf mixing tube portion 418, step 612. The abrasive-fluid jet exiting the thin kerf mixing tube 418 is caught in the catching device 450, step 614, and routed through the filtering device 452 to separate and dispose of debris, step 616. The abrasive-fluid mixture can optionally be routed through the conditioning device 454 to remove a portion of liquids therein, such as water, step 618. The filtered abrasives are recycled back into the system 400 through the entry port 432 via the pump 448, step 620.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and equivalents thereof.

The invention claimed is:

1. A method of in-situ recycling of an abrasive mixture in a high-pressure liquid jet system comprising:
introducing a high-pressure liquid through a high-pressure liquid bore to a mixing area including at least a portion of the high-pressure liquid bore and an abrasive entry port;
introducing a liquid-abrasive mixture to the mixing area through the abrasive entry port for being mixed with the high-pressure liquid and forming an abrasive-liquid mixture;
discharging the abrasive-liquid mixture from the high-pressure liquid system through a discharge bore axially aligned with the high-pressure liquid bore and configured to form a high-pressure abrasive-liquid jet;
catching at least a portion of the abrasive-liquid jet comprising an abrasive-liquid mixture exiting the discharge bore in a catching device;
filtering the caught abrasive-liquid mixture in a filtering device to separate and dispose debris and derive a filtered abrasive mixture; and
pumping the filtered abrasive mixture out of the filtering device and into the mixing area through the abrasive entry port to be mixed with high-pressure liquid.

2. A method of in-situ recycling of an abrasive mixture in a high-pressure fluid jet system comprising:
introducing a high-pressure fluid through a high-pressure fluid bore to a mixing area including at least a portion of the high-pressure fluid bore and an abrasive entry port;
introducing an abrasive mixture to the mixing area through the abrasive entry port for being mixed with the high-pressure fluid and forming an abrasive-fluid mixture;
discharging the abrasive-fluid mixture from the high-pressure fluid system through a discharge bore axially aligned with the high-pressure fluid bore and configured to form a high-pressure abrasive-fluid jet;
catching at least a portion of the abrasive-fluid jet comprising an abrasive-fluid mixture exiting the discharge bore in a catching device;
filtering the caught abrasive-fluid mixture in a filtering device to separate and dispose debris and derive a filtered abrasive mixture;
pumping the filtered abrasive mixture out of the filtering device and into the mixing area through the abrasive entry port to be mixed with high-pressure fluid;
diverting excess abrasive-fluid mixture away from the discharge bore and out of the mixing area; and
pumping the excess abrasive-fluid mixture through the abrasive entry port to the mixing area to recycle at least a portion of the excess abrasive-fluid mixture.

3. The method of claim 1, further comprising:
partially removing liquid from the caught abrasive-liquid mixture through a conditioning device.

4. The method of claim 1 wherein introducing the high-pressure liquid includes introducing the high-pressure liquid through the high-pressure bore being formed in an orifice mount with a velocity generating orifice toward an upstream end thereof.

5. The method of claim 4 wherein discharging the abrasive-liquid mixture includes discharging the abrasive-liquid mixture through the discharge bore being formed in a mixing tube coupled to the orifice mount.

6. The method of claim 4 wherein introducing the liquid-abrasive mixture includes introducing the liquid-abrasive mixture to the mixing area through the abrasive entry port being formed in the orifice mount.

7. A method of in-situ recycling of an abrasive mixture in a high-pressure fluid jet system comprising:
introducing a high-pressure fluid to a mixing area of the high-pressure fluid jet system through a pressure-generating orifice;
introducing an abrasive mixture to the mixing area to be mixed with the high-pressure fluid and form an abrasive-fluid mixture;
discharging a first portion of the abrasive-fluid mixture from the high-pressure fluid jet system through a discharge bore to form a high-pressure abrasive-fluid jet;
diverting a second portion of the abrasive-fluid mixture away from the discharge bore and out of the mixing area; and
pumping the diverted second portion of the abrasive-fluid mixture through the abrasive entry port to the mixing area.

8. The method of claim 7, wherein introducing the high-pressure fluid to the mixing area of the high-pressure fluid jet system includes delivering the high-pressure fluid towards the diverted second portion of the abrasive-fluid mixture pumped into the mixing area, the mixing area being positioned between the pressure-generating orifice and the discharge bore.

9. The method of claim 1, wherein pumping the filtered abrasive mixture includes delivering the filtered abrasive mixture that comprises at least one of a wet flowable abrasive, an abrasive paste, and an abrasive foam through the abrasive entry port into the mixing area.

10. The method of claim 1, wherein pumping the filtered abrasive mixture includes delivering the filtered abrasive-liquid mixture along a liquid path extending from the filtering device to the mixing area.

11. The method of claim 1, further comprising:
pumping the caught abrasive-liquid mixture from the catching device along a liquid circuit to the filtering device, the liquid circuit fluidically coupling the catching device to the filtering device.

12. A method of in-situ recycling of an abrasive mixture in a high-pressure liquid jet system comprising:
delivering a high-pressure liquid through a velocity generating orifice to a mixing area;
delivering a liquid-abrasive mixture to the mixing area to mix the liquid-abrasive mixture with the high-pressure liquid to produce an abrasive-liquid mixture;
delivering the abrasive-liquid mixture from the mixing area through a discharge bore to form an abrasive-liquid jet;
catching at least a portion of the abrasive-liquid jet exiting the discharge bore in a catching device;
filtering the caught abrasive-liquid mixture in a filtering device to separate debris and a filtered abrasive mixture, the filtering device being fluidically coupled to the catching device and fluidically coupled to the mixing area;
delivering the filtered abrasive mixture from the filtering device along a liquid circuit to the mixing area; and
mixing the filtered abrasive mixture with the high-velocity liquid in the mixing area.

13. The method of claim 12, wherein delivering the filtered abrasive mixture comprises pumping at least one of an abrasive paste, an abrasive foam, and a wet flowable liquid-abrasive out of the filtering device to the mixing area.

14. A method of in-situ recycling of an abrasive mixture in a high-pressure fluid jet system comprising:
delivering a high-pressure fluid through a pressure-generating orifice to a mixing area;

delivering an abrasive mixture to the mixing area to mix the abrasive mixture with the high-pressure fluid to produce an abrasive-fluid mixture;

delivering the abrasive-fluid mixture from the mixing area through a discharge bore to form an abrasive-fluid jet;

catching at least a portion of the abrasive-fluid jet exiting the discharge bore in a catching device;

filtering the caught abrasive-fluid mixture in a filtering device to separate debris and a filtered abrasive mixture, the filtering device being fluidically coupled to the catching device and fluidically coupled to the mixing area;

delivering the filtered abrasive mixture from the filtering device along a fluid circuit to the mixing area;

mixing the filtered abrasive mixture with the high-pressure fluid in the mixing area; and diverting excess abrasive-fluid mixture away from the discharge bore and out of the mixing area; and delivering the excess abrasive-fluid mixture to the mixing area to recycle at least a portion of the excess abrasive-fluid mixture.

15. The method of claim 1, wherein filtering the caught abrasive-liquid mixture in the filtering device includes preventing solids of the abrasive-liquid mixture that are larger than a predetermined size from being pumped to the mixing area.

16. The method of claim 1, wherein introducing the high-pressure liquid through the high-pressure liquid bore comprises accelerating a flow of the high-pressure liquid to form a liquid jet.

17. The method of claim 16, further comprising delivering the liquid jet exiting a velocity generating orifice in a nozzle to the mixing area in the nozzle.

18. The method of claim 1, wherein the high-pressure liquid bore is defined by a jewel orifice.

19. The method of claim 7, further comprising:
catching at least a portion of the high-pressure abrasive-fluid jet exiting the discharge bore in a catching device;
filtering the caught abrasive-fluid mixture using a filtering device to provide a filtered abrasive mixture; and
pumping the filtered abrasive mixture into the mixing area.

20. The method of claim 19, wherein pumping the filtered abrasive mixture comprises pumping at least one of an abrasive paste, an abrasive foam, and a wet flowable abrasive to the mixing area.

21. The method of claim 19, wherein pumping the filtered abrasive mixture includes delivering the filtered abrasive mixture along a fluid path extending from the filtering device to the mixing area.

22. A method of in-situ recycling of an abrasive mixture in a high-pressure liquid jet system comprising:
accelerating a flow of a high-pressure liquid to form a high-pressure jet in a nozzle;
delivering the high-pressure jet to a mixing area in the nozzle;
delivering a liquid-abrasive mixture to the mixing area through an abrasive entry port to mix the liquid-abrasive mixture and the high-pressure liquid of the high-pressure jet;
discharging the mixed liquid-abrasive mixture and the high-pressure liquid out of the nozzle to produce an abrasive-liquid jet;
catching at least a portion of the abrasive-liquid jet exiting a discharge bore of the nozzle in a catching device;
filtering the caught abrasive-liquid mixture in a filtering device to separate and dispose debris and derive a filtered abrasive mixture; and
pumping the filtered abrasive mixture out of the filtering device and into the mixing area through the abrasive entry port.

23. The method of claim 22, wherein accelerating the flow of the high-pressure liquid comprises delivering the high-pressure liquid through a velocity generating orifice in the nozzle.

24. The method of claim 22, wherein pumping the filtered abrasive mixture comprises delivering the filtered abrasive mixture into a pump and outputting the filtered abrasive mixture from the pump towards the abrasive entry port.

25. The method of claim 22, wherein pumping the filtered abrasive mixture comprises delivering the filtered abrasive mixture having an abrasive to water mass ratio of at least approximately 20% through the abrasive entry port.

26. The method of claim 1, wherein pumping the filtered abrasive mixture out of the filtering device comprises delivering the filtered abrasive mixture into a pump and outputting pressurized filtered abrasive mixture from the pump towards the abrasive entry port.

27. The method of claim 12, further comprising:
pumping the filtered abrasive mixture to the mixing area using a pump having an upstream end fluidically coupled to the filtering device and a downstream end fluidically coupled to the mixing area.

28. The method of claim 12, wherein delivering the filtered abrasive mixture along the liquid circuit comprises passing the filtered abrasive mixture through a pump and into the mixing area.

29. A method of recycling, comprising:
delivering a high-pressure liquid to a mixing area in a nozzle;
delivering a liquid-abrasive mixture into the mixing area to mix the liquid-abrasive mixture and the high-pressure liquid to produce a mixture having an abrasive to water mass ratio of at least approximately 20%;
outputting the mixture out of the nozzle to produce an abrasive-liquid jet;
catching at least a portion of the abrasive-liquid jet exiting the nozzle using a catching device;
filtering the caught abrasive-liquid jet using a filtering device to produce a filtered abrasive mixture;
delivering the filtered abrasive mixture out of the filtering device and into a pump;
passing the filtered abrasive mixture through the pump; and
delivering the filtered abrasive mixture from the pump to the mixing area.

* * * * *